May 24, 1932. W. L. POTTS ET AL 1,860,266
BURIAL VAULT
Filed Sept. 8, 1930   2 Sheets-Sheet 2
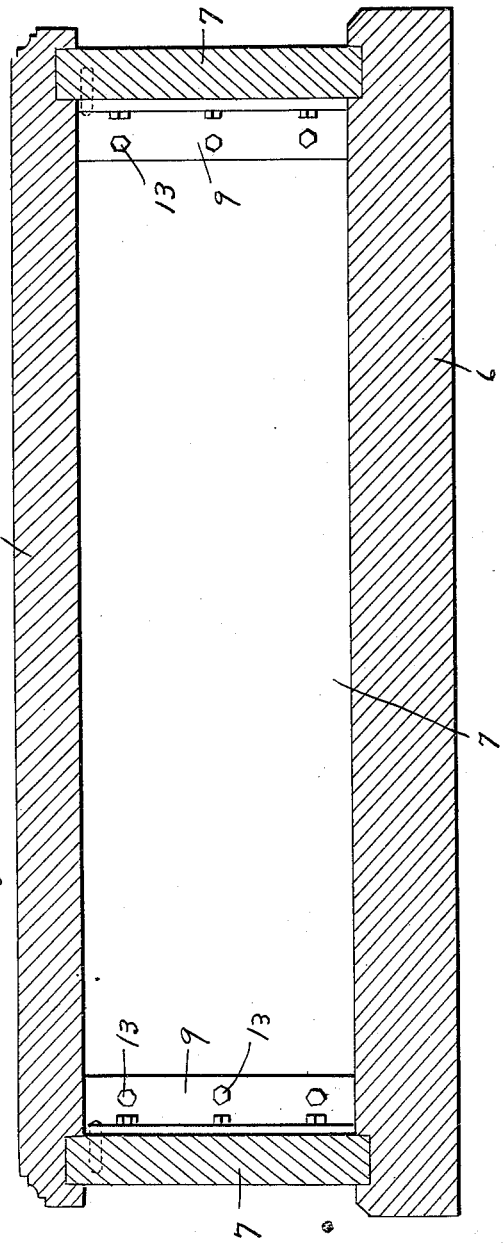
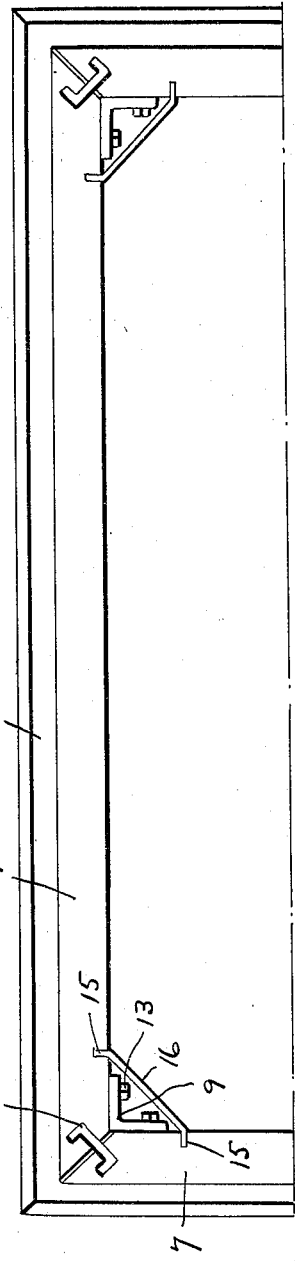
Inventors
W. L. Potts
M. E. Potts
By Clarence A. O'Brien
Attorney Patented May 24, 1932

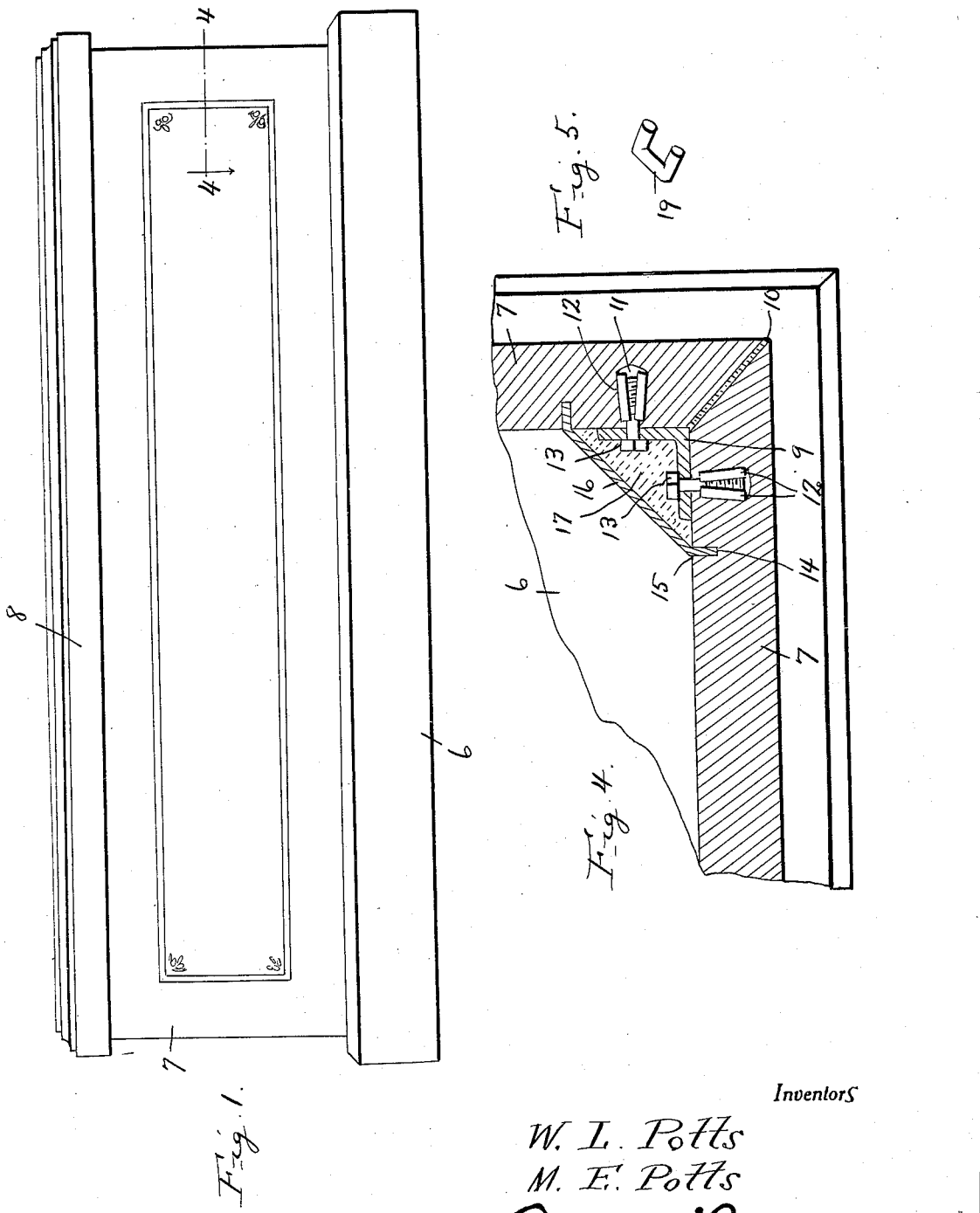

1,860,266

UNITED STATES PATENT OFFICE

WINNIE L. POTTS AND MORTON E. POTTS, OF PARSONS, KANSAS

BURIAL VAULT

Application filed September 8, 1930. Serial No. 480,585.

This invention relates to an improved burial vault, and has more particular reference to this class which is built up from sections or slabs of stone, concrete or equivalent hard texture material.

The primary novelty is predicated upon the corner construction which is expressly designed for securing the slabs or various sections of the device together in a permanent and dependable manner.

The particular details constituting the novelty of the improved arrangement, will become more readily apparent from the following description and drawings.

In the drawings:

Figure 1 is a side elevational view of a mausoleum or portable burial vault constructed in accordance with the present inventive conception.

Figure 2 is a longitudinal sectional view through the same with certain of the details removed for clearness.

Figure 3 is a fragmentary plan view with the metallic members in place to form a receptacle for reception of the uniting concrete.

Figure 4 is a fragmentary corner section taken approximately on the plane of the line 4—4 of Figure 1.

Figure 5 is a perspective view of a tie corner bracket.

As shown in Figure 1 the numeral 6 designates the base and 7 represents one of the side walls or slabs while 8 denotes the top or cover. A primary feature of the construction is the means for attaching the side and end walls to the base to form a complete box. The means chosen to accomplish this purpose is detailed in Figure 4. Here the numeral 9 designates a cornice member in the nature of an angle iron of suitable proportions. The walls 7 illustrated in Figure 4 come together and are spaced slightly apart with their several surfaces abutting a runway for reception of connecting concrete 10. These walls are both formed with sockets 11 to accommodate the expansible anchoring devices or elements 12, these elements serving to receive the threaded ends of the adjacent connecting bolts 13. Any suitable number of bolts may be provided for anchoring or bolting the angle plate 9 to the walls 7. The walls are formed with a groove or channel 14 for reception of the end flanges 15 of a diagonal retaining and form plate 16. When this plate 16 is arranged in position it forms a receptacle into which binding or bonding material such as concrete 17 is poured and is allowed to harden. When the bonding material sets it secures the plates 9 and 16 together as well as the associated walls 7. At a point where the walls meet as shown in Figure 3 the top edges of the walls are formed with depressions which come together and provide a substantially U-shaped seat 18 and this is designed to receive the U-shaped tie bracket 19 which is cemented or otherwise fastened in place.

All of these elements operate in a mechanical sense to form a secure cornice bond for maintaining the walls in assembled relation.

Feature 10 is a miter joint left one-quarter inch wide for sealing the corner air tight. Portions 17 and 10 both seal together, it being noted here that 9 does not come to the top, which allows the cement portions (which is cement and water—no sand) to make a complete corner seal airtight. When 16 is inserted down from the top and poured with cement it covers and hides 9, 12 and 13.

A triangle one-quarter inch wide of wood is used to keep the mortar in place at the outer end of 10 until the cement is set and then it is taken away, leaving a perfect joint. The numeral 12 indicates an expansion and anchoring elements inserted in drilled hole. 13 is the bolt that is tapered and expands as it tightens. 12 and 13 are really one and come together as one bolt. As 13 is tightened by threading action it expands parts 12 causing them to hold securely.

From the foregoing description and drawings it will be seen that I have evolved and produced a simple and economical construction for assembling and maintaining the parts of a vault in cooperating position. The simplicity is such as to obviate the necessity of including a more detailed description for it is obvious that persons skilled in the art to which the invention relates will obtain a clear understanding of the features and construction.

Minor changes in shape, size, proportions and rearrangement of materials may be resorted to in actual practice if desired.

We claim:

In a structure of the class described, a pair of complemental walls, an angle plate associated with the meeting ends thereof, said walls having sockets, anchoring elements in said sockets, bolts passing through the flanges of said angle plates attached to the anchoring elements, said walls having vertical grooves, a corner plate having flanges extending into said grooves, and concrete packed between the angle plate and cornice plate for maintaining all of said parts in assembled connected relationship.

In testimony whereof we affix our signatures.

WINNIE L. POTTS.
MORTON E. POTTS.